US012782589B2

(12) United States Patent
Liepkalns

(10) Patent No.: US 12,782,589 B2
(45) Date of Patent: Nov. 3, 2026

(54) DEVICE FOR DETECTING LOW-INTENSITY ALPHA PARTICLES

(71) Applicant: SAF TEHNIKA, AS, Riga (LV)

(72) Inventor: Didzis Liepkalns, Riga (LV)

(73) Assignee: SAF TEHNIKA, AS, Riga (LV)

( * ) Notice: Subject to any disclaimer, the term of this patent is extended or adjusted under 35 U.S.C. 154(b) by 97 days.

(21) Appl. No.: 18/877,176

(22) PCT Filed: Jul. 18, 2024

(86) PCT No.: PCT/LV2024/050009

§ 371 (c)(1),
(2) Date: Dec. 19, 2024

(87) PCT Pub. No.: WO2024/232748

PCT Pub. Date: Nov. 14, 2024

(65) Prior Publication Data

US 2025/0383457 A1 Dec. 18, 2025

(30) Foreign Application Priority Data

Feb. 5, 2024 (LV) .......................... LVP2024000010

(51) Int. Cl.
*G01T 1/175* (2006.01)
*G01T 1/185* (2006.01)

(52) U.S. Cl.
CPC .............. *G01T 1/175* (2013.01); *G01T 1/185* (2013.01)

(58) Field of Classification Search
CPC ........... G01T 1/175; G01T 1/185; G01T 1/16; G01T 1/17; G01T 1/20; G01T 7/00
See application file for complete search history.

(56) References Cited

U.S. PATENT DOCUMENTS 3,984,690 A * 10/1976 Marshall, III ........ H03M 1/447 250/374
5,969,505 A * 10/1999 Okamura ................ H02J 7/345 320/122

FOREIGN PATENT DOCUMENTS

CN 1811376 A 8/2006
CN 216351253 U 4/2022

OTHER PUBLICATIONS

International Search Report for International Application No. PCT/LV2024/050009, Completed by the International Patent Office, Dated Sep. 13, 2024, 9 pages.

* cited by examiner

*Primary Examiner* — Courtney D Thomas
(74) *Attorney, Agent, or Firm* — Brooks Kushman P.C.

(57) ABSTRACT

Devices for the radiation detection and analysis, in particular to portable alpha particle sensors adapted for the identification and quantification of radioactive decay products—alpha particles including a battery-powered pulse ionization chamber alpha particle sensor comprising at least one electric battery, at least one switch S, a voltage converter DC/DC, a capacitor C, a processor MCU, a current pulse amplifier A, an ionization chamber K with an electrode of zero potential placed therein. The ionization chamber K is designed with the possibility of placing a source of alpha particles in it. Furthermore at least one electric battery is electrically connected to the voltage converter DC/DC by means of a switch S, the operation of which is controllable by the processor MCU. The voltage converter DC/DC is electrically connected to the capacitor C and the ionization chamber K. The electrode of the ionization chamber K is electrically connected to the processor MCU through the current pulse amplifier A. The processor MCU furthermore is adapted to execute the instructions: (i) count electrical (Continued)

pulses N, which coming from the K electrode of the ionization chamber and which are amplified by the amplifier A; (ii) by means of at least one switch S, controllably periodically electrically connect the supply of electric energy from at least one electric battery to the voltage converter DC/DC and further in the circuit; (iii) determine the voltage value on the capacitor C and, upon reaching the previously set maximum value of the voltage, by means of the switch S, electrically disconnect the supply of electric energy from the electric battery to the voltage converter DC/DC and further in the circuit.

6 Claims, 1 Drawing Sheet

DEVICE FOR DETECTING LOW-INTENSITY ALPHA PARTICLES

CROSS-REFERENCE TO RELATED APPLICATIONS

This application is the U.S. national phase of PCT Application No. PCT/LV2024/050009 filed on Jul. 18, 2024, which claims priority to Latvian Patent Application No. LVP2024000010 filed on Feb. 5, 2024, which are incorporated herein by reference in their entireties.

TECHNICAL FIELD

The invention relates to devices for the radiation detection and analysis, in particular, to portable alpha particle sensors adapted for the identification and quantification of radioactive decay products—alpha particles.

BACKGROUND

Alpha particles are one type of the ionizing radiation, they are helium atomic nuclei that are emitted in specific radioactive decay processes. For their detection and measurement various types of sensors are used comprising ionization chambers, scintillation detectors, and semiconductor detectors, which are used to detect and analyse radioactive radiation sources. Traditional alpha particle detectors are usually stationary and require an external power supply, which limits their application spectrum to particularly remote or hard-to-reach locations.

The concept of using an ionization chamber to detect alpha particles and measure radiation intensity is a known principle in nuclear physics and radiation detection technology. An ionization chamber works by ionizing the gas in the chamber when radiation, such as alpha particles, passes through it. The ionization event leads to the release of electrons and positively charged ions that can be detected as an electrical signal.

An X-ray and gamma radiation detection device is known comprising an ionization chamber detector. The detector is connected to an electrometer-level preamplifier circuit, which in turn is coupled with ranging, auto-zeroing circuits and a microcontroller. The range switching circuit comprising a relay, triodes, resistors as well as a capacitor. The known device allows for the creation of two-level X-ray and gamma-ray detection circuits that switch [1].

A mobile ionization chamber is known which is designed to monitor how much radiation from an x-ray source is delivered to x-ray film. The ionization chamber, along with the portable power supply, is housed in an insulated enclosure to minimize electrical hazards to the patient and operator involved in the X-ray procedure [2].

An alpha particle detection device [3] is known comprising an ionization chamber with a plurality of holes for air circulation and means for applying a voltage to produce an electric field. The device also includes main and secondary probes that absorb ion charge and leakage current, as well as a guard band. The device also comprises two preamplifiers and a differential amplifier that amplifies the signal and eliminates noise.

There is known an alpha surface pollution-surveying instrument that features a flexible air-pumping pipe connected to a fan and an ionization chamber, with the fan powered by a power supply. The ionization chamber's electrode plate connects to the power supply and an I-V converter, which links to an A/D converter and then to a single-chip computer. The computer interfaces with a keyboard, alarm, and memory, while the power supply also connects to the A/D converter [4].

The present invention is a battery-powered pulse ionization chamber alpha particle sensor comprising at least one electric battery, at least one switch S, a voltage converter DC/DC, a capacitor C, a processor MCU, a current pulse amplifier A, an ionization chamber K wherein electrode with zero potential is inserted. The ionization chamber K is designed with the possibility of placing a source of alpha particles in it. Furthermore at least one electric battery is electrically connected to the voltage converter DC/DC by means of a switch S, the operation of which is controllable by the processor MCU. The voltage converter DC/DC is electrically connected to the capacitor C and the ionization chamber K. The electrode of the ionization chamber K is electrically connected to the processor MCU via the current pulse amplifier A. In addition, the processor MCU is adapted to execute the instructions: (i) count electrical pulses N, which coming from the electrode of the ionization chamber K and which are amplified by the amplifier A; (ii) using at least one switch S, controllably periodically electrically connect the supply of electric energy from at least one electric battery to the voltage converter DC/DC and further in the circuit; (iii) determine the voltage value on the capacitor C and, upon reaching the previously set maximum value of the voltage using the switch S, electrically disconnect the supply of electric energy from the electric battery to the voltage converter DC/DC and further in the circuit. According to an embodiment of the invention, the processor MCU may be further adapted to execute instructions for determining the intensity of alpha radiation, guided by the received information about the number of electric pulses N coming from the electrode of the ionization chamber. The processor MCU can further contain instructions to control how long the charging of the capacitor C takes place and to determine when the voltage on the capacitor C and, therefore, the voltage of the ionization chamber K has reached a previously set maximum value.

According to another embodiment of the invention, the device comprises two switches: a first switch S1 and a second switch S2, the operation of which is controllable by a processor MCU. The first switch S1 in the electrical circuit is located before the voltage converter DC/DC, and the second switch S2 in the electrical circuit is located after the voltage converter DC/DC, but before the capacitor C and the ionization chamber K.

According to another embodiment of the invention, the device includes a diode D, which is located in the electrical circuit after the voltage converter DC/DC, but before the capacitor C and the ionization chamber K. Said device further includes a voltage divider made of resistors R1 and R2, which in the electrical circuit is located after the voltage converter DC/DC, but before the diode D; the point between the resistors R1 and R2 is electrically connected to the processor MCU, making it possible to detect the voltage on the capacitor C.

According to the embodiment, the voltage converter DC/DC is designed to have an output voltage in the range between 40 V and 200 V.

DETAILED DESCRIPTION

Figure 1:
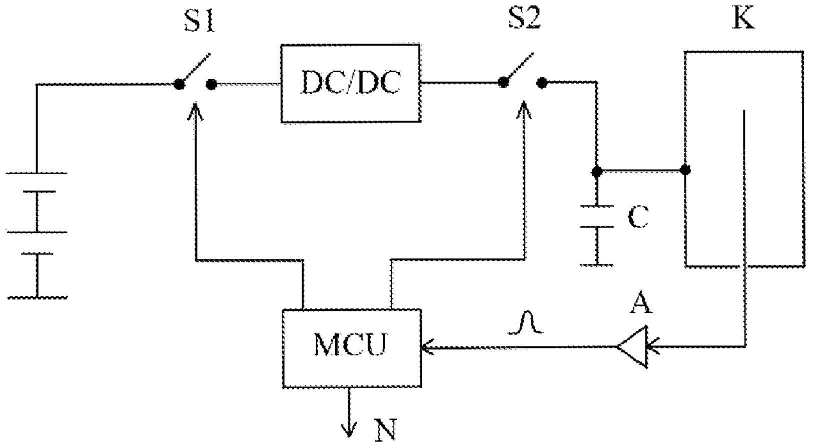
FIG. 1—one embodiment of the proposed battery powered pulse ionization chamber alpha particle sensor.

The proposed sensor is intended for the detection of low-intensity alpha particles. The proposed device consumes relatively little energy so that it can be powered by batteries for a long time. A source of alpha particles is placed in the ionization chamber K. Alpha particles ionize the gases in the air of the chamber K. By recording the ionization event, it is possible to record each alpha particle, thus also determine the intensity of the radiation. An electrode with zero potential is placed in the ionization chamber K, and its supply voltage is connected to the chamber (FIG. 1). The current pulse generated by the ions is amplified by amplifier A.

According to one of the embodiments of the invention, the processor MCU can have two modes, which have the following functions: (i) to process the signal of the amplifier A and count the number of pulses N in a time unit, which is proportional to the intensity of alpha radiation; (ii) measure the voltage applied to capacitor C and the time taken to charge it, and control the supply circuit based on the measured voltage value.

The supply voltage of the ionization chamber K must have minimal pulsation, i.e. such that it does not cause unwanted operation of the processor MCU at the output of the amplifier A. The desired value of the voltage must be within certain limits—from 40 to 200 V, because the sensitivity of the sensor depends on it. To meet these conditions, using as little energy as possible, the following technique can be used: from the battery voltage (which is usually in the range between 3 V and 6 V), the camera voltage is obtained by means of a voltage converter DC/DC, which is periodically connected to the battery voltage with switch S1 and with switch S2 at the capacitor C, which in turn is connected to the ionization chamber K (FIG. 1). At the moment of switching on (or changing the MCU mode of the processor), a pulse occurs at the output of the amplifier A, but it is not added to the total number of pulses N. The cycle period is chosen so that the voltage of the capacitor C is never less than the minimum selected voltage value. In this way, the self-consumption of the voltage converter is excluded from the analysis of the obtained data.

Figure 2:
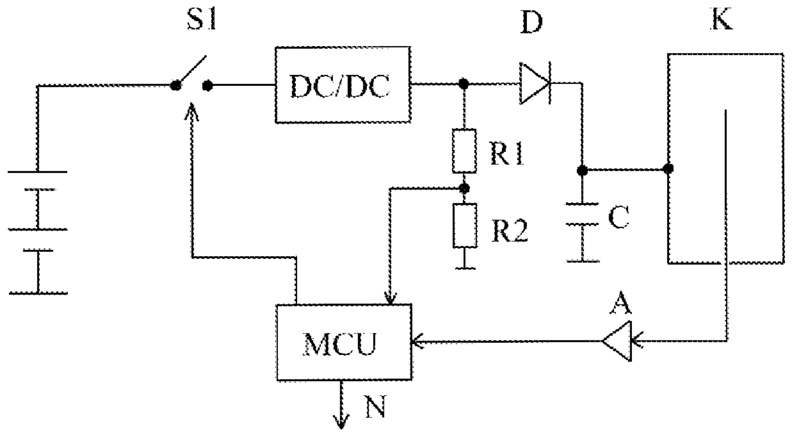
FIG. 2—another embodiment of the proposed battery powered pulse ionization chamber alpha particle sensor.

According to another embodiment, the voltage converter DC/DC is switched on and off by a processor MCU controlling the switch S1 (FIG. 2). At its output, there is a voltage divider of resistors R1 and R2, from which a voltage proportional to the output voltage of the voltage converter is supplied to the processor MCU. By means of the diode D, this voltage is connected to the capacitor C. When the set voltage value is reached, the processor MCU turns off the voltage converter, and the circuit operates in pulse counting mode for the specified period of time. By controlling how long the repeated charging of the capacitor C takes place at the end of this period, it can be indirectly concluded whether the voltage on the capacitor (and therefore the voltage of the chamber K) has not fallen below the permissible limit. This circuit implementation ensures that the voltage converter DC/DC is operated only long enough to restore the voltage value to C, thus not wasting unnecessary energy.

The proposed portable and autonomous device can be used to monitor radioactive contamination of the environment.

REFERENCES CITED

1. CN216351253U.
2. U.S. Pat. No. 4,427,946A.
3. WO2017034158A1.
4. CN1811376A.

The invention claimed is:

1. A device for detecting low-intensity alpha particles, the device comprising at least one electric battery, at least one switch S, a voltage converter DC/DC, a capacitor C, a processor MCU, a current pulse amplifier A, an ionization chamber K with an electrode of zero potential placed therein, and the ionization chamber K is designed with the possibility of placing a source of alpha particles in the ionization chamber K; wherein the at least one electric battery is electrically connectable to the voltage converter DC/DC by means of a switch of the at least one switch S, and the operation of the at least one switch S is controllable by the processor MCU; the voltage converter DC/DC is electrically connected to the capacitor C and the ionization chamber K; the electrode of the ionization chamber K is electrically connected to the processor MCU through the current pulse amplifier A; wherein the MCU processor is adapted to execute the instructions:

(i) count the electric pulses N coming from the electrode of the ionization chamber K and which are amplified by the current phase amplifier A;

(ii) by means of the switch of the at least one switch S, periodically electrically connect the supply of electric energy from the at least one electric battery to the voltage converter DC/DC and further in an electrical circuit including the at least one switch, the DC/DC converter, the capacitor, and the ionization chamber K; and (iii) determine the voltage value on the capacitor C, and when the voltage value on the capacitor C reaches a previously set maximum value of the voltage, by means of the switch of the at least one switch S, electrically disconnect the supply of electrical energy from the electric battery to the voltage converter DC/DC and further in the electrical circuit.

2. The device according to claim 1, wherein the at least one switch S comprises two switches: a first switch S1 and a second switch S2, the operation of which are controllable by the processor MCU, wherein the first switch S1 is located in the electrical circuit before the voltage converter DC/DC, and the second switch S2 is located in the electrical circuit after the voltage converter DC/DC, but before the capacitor C and the ionization chamber K.

3. The device according to claim 1, further comprising:

a diode D, the diode D located in the electrical circuit after the voltage converter DC/DC, but before the capacitor C and the ionization chamber K; and a voltage divider formed by resistors R1 and R2, the voltage divider located in the electrical circuit after the voltage converter DC/DC but before the diode D; a point between the resistors R1 and R2 is electrically connected to the processor MCU, making it possible to detect the voltage on the capacitor C.

4. The device according to claim 1, wherein the processor MCU is further adapted to execute instructions for determining an intensity of alpha radiation based on the number of electrical pulses N coming from the electrode of the ionization chamber K.

5. The device according to claim 1, wherein the voltage converter DC/DC is designed to have an output voltage in the range between 40 V and 200 V.

6. The device according to claim 1, wherein the processor MCU contains instructions to control the charging time of the capacitor C; and to determine the moment when the voltage on the capacitor C, and therefore the voltage of the ionization chamber K, has reached the previously set maximum value.

* * * * *